UNITED STATES PATENT OFFICE.

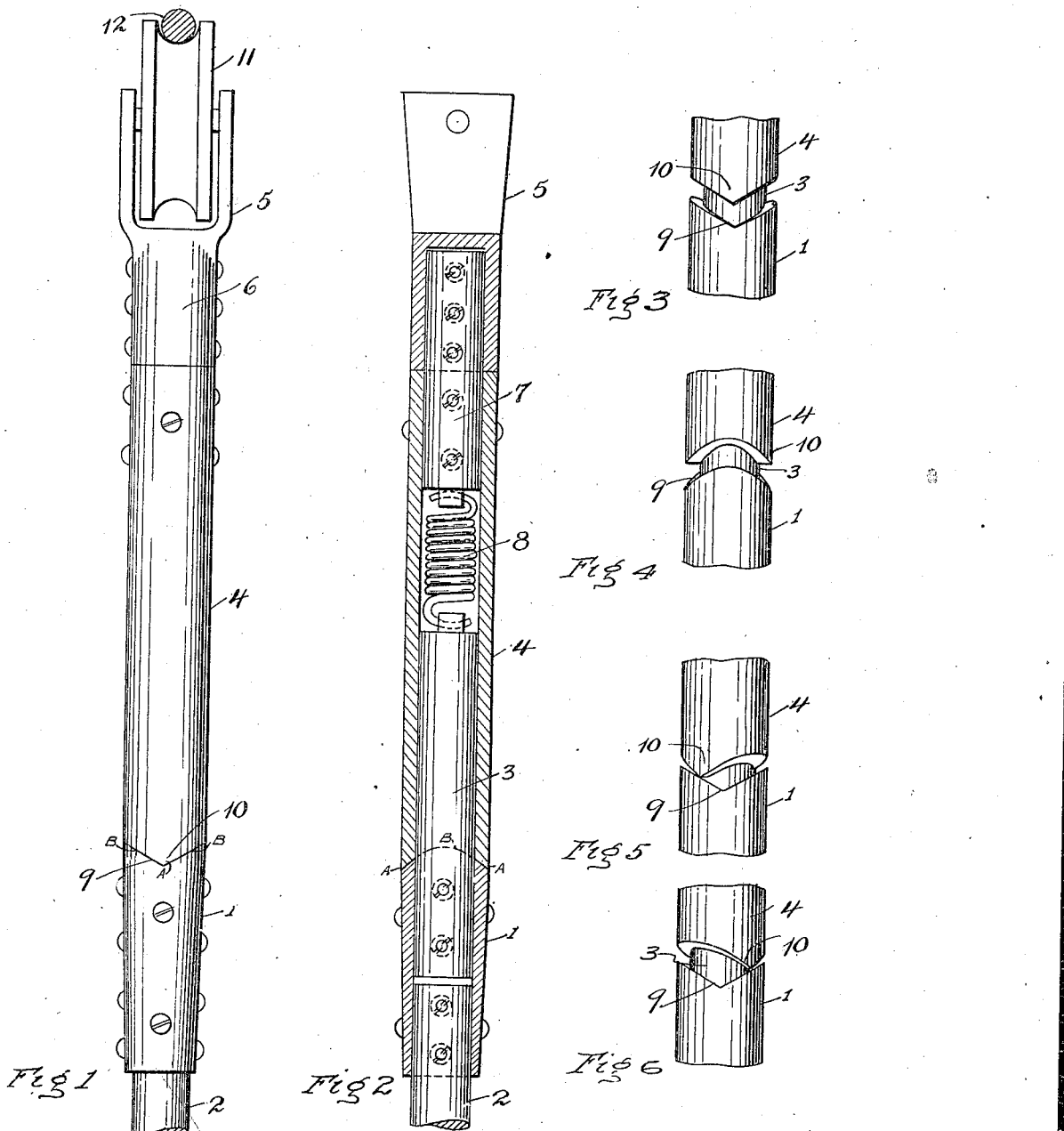

GUSTAVE ULRICH, OF LOS ANGELES, CALIFORNIA.

TROLLEY-WHEEL ADJUSTER.

1,184,054.

Specification of Letters Patent.

Patented May 23, 1916.

Application filed August 28, 1915. Serial No. 47,827.

*To all whom it may concern:*

Be it known that I, GUSTAVE ULRICH, a citizen of the United States, residing at Los Angeles, in the county of Los Angeles and State of California, have invented new and useful Improvements in Trolley-Wheel Adjusters, of which the following is a specification.

This invention relates to a trolley wheel adjuster and particularly pertains to a swivel mounting for trolley wheels to permit lateral turning of the wheel in relation to the trolley pole.

It is the object of this invention to provide a device for maintaining a trolley wheel in tracking relation to a trolley wire with which it is engaged, irrespective of the position of the trolley pole, so as to prevent the wheel from running off the wire when traversing curves or switches.

Another object is to provide means for minimizing the friction upon the trolley wire and the walls of the groove of a trolley wheel engaged therewith.

Another object is to provide a construction which will permit the trolley wheel to turn laterally on side or twisting strains being delivered thereto and automatically restore it to a normal central position on being relieved of such strains.

The invention is particularly applicable for use on street cars and other vehicles employing a trolley pole and wheel for transmission of electricity from the trolley wire to the operating mechanisms of the vehicle, and embodies a device for connecting the trolley wheel to the trolley pole which will operate to adjust the movement of the trolley wheel to a perfect contact and alinement with the trolley wire in such manner that the movement of the vehicle forward or backward or at an angle either to right or left of the trolley wire, will not alter the alinement of the trolley wheel in relation to the trolley wire and cause it to automatically conform to the angle of direction of any switch wire which may be encountered.

The invention is illustrated in the accompanying drawings in which:

Figure 1 is a view in side elevation of the trolley wheel and its mounting, showing it in its normal centered position. Fig. 2 is a view of same in transverse section and elevation. Figs. 3, 4, 5 and 6 are details in elevation illustrating the construction and operation of the centering device.

More specifically, 1 indicates a collar which is rigidly mounted on the outer end of a trolley pole 2 in any desired manner; the collar being here shown as encircling the trolley pole and as securely fastened thereto. Projecting outwardly from the collar 1 is a cylindrical bar or post 3 on which a tubular sleeve 4 is turnably and reciprocally mounted. The sleeve 4 carries a trolley harp 5 on its outer end, which is rigidly held in relation thereto; the harp 5 having a tubular shank 6 which is fastened on a bar 7 extending into and secured to the sleeve 4. Interposed between the post 3 and the bar 7 is a spring 8, one end of which is secured to the post and the opposite end secured to the bar, as particularly shown in Fig. 2. This spring 8 exerts a pull on the bar 7 and sleeve 4 toward the post 3 in such manner as to normally maintain the sleeve in a seated position on the collar 1; the upper end of the collar forming a shoulder for limiting the inward movement of the sleeve. The spring 8 is of the helical type so as to yieldably oppose rotary movement of the sleeve in either direction as well as exert an inward longitudinal pull on the sleeve.

The outer end of the collar 1 is formed with diametrically opposed depressions 9 here shown as V-shaped in form, adapted to receive convergent or V-shaped extended portions 10 on the inner end of the sleeve 4; the extension 10 normally seating in the depression 9 as shown in Fig. 1. Oppositely inclined faces B are thus formed on the adjacent ends of the collar and sleeve which coöperate and act cam fashion to cause the sleeve 4 to advance longitudinally on the post 3 when the sleeve is moved a partial revolution in either direction.

In the operation of the invention, when a torsional strain is imposed on the sleeve 4 or trolley pole 2 in either direction in relation to each other such as is caused by the side flanges of the trolley wheel 11 on the harp 5 engaging the trolley wire 12 in traversing curves, the sleeve 4 will turn in relation to the post 3 in opposition to the spring 8 and the points A of the V-shaped extensions 10 thereon will move upwardly on the inclined faces B on the collar 1 as shown in Figs. 5 and 6. This will cause the sleeve to advance and turn on the post 3 in opposition to the tension of the spring 8. On the torsional strain being relieved on the sleeve or trolley pole, the spring in exerting an inward longitudinal pull on the sleeve causes the V-shaped end A of the latter to move downwardly and laterally on the inclined face B into the apex of the depression 10 in the collar into its normal centered position shown in Fig. 1; thus restoring the wheel 11 to its normal position. The spring 8 and the interengaged ends of the sleeve and collar thus coöperate to normally maintain the trolley wheel 11 in proper alined relation to the trolley pole; the swivel mounting of the sleeve 4, however, permitting of a lateral turning movement of the trolley wheel so that the latter will readily aline with the trolley wire and traverse curvatures therein with a minimum of danger of jumping the wire by reason of the wheel being disposed angularly thereof.

What I claim is:

1. The combination of a trolley pole, a collar thereon formed with a pair of oppositely inclined faces on its opposite sides, a sleeve mounted to have longitudinal and turnable movement on the pole formed with a pair of convergent faces engageable with the inclined faces on the collar, a trolley wheel carried by the sleeve, and a spring connecting the sleeve and trolley pole, exerting an inward longitudinal pull on the sleeve and yieldably opposing rotary movement thereof.

2. The combination with a trolley pole, of a sleeve mounted to have longitudinal and turnable movement thereon, a helical spring secured at one end in relation to the pole and connecting with the sleeve at its opposite end exerting a longitudinal pull on the sleeve and yieldably opposing rotary movement thereof, said sleeve and pole having inter-engaging members coöperating with the spring to maintain the sleeve in a normal central position.

3. The combination with a trolley pole having inclined faces, of a sleeve mounted to have longitudinal and turnable movement on the pole, having diametrically opposed convergent faces engageable with the inclined faces on the pole, and a helical spring secured at one end in relation to the pole and engaging the sleeve at its opposite end, exerting a longitudinal pull on the sleeve and yieldably opposing rotary movement thereof.

4. The combination of a trolley pole, a reciprocable and turnable sleeve thereon, a trolley wheel carried by said sleeve, and spring means connecting said sleeve and pole for yieldably opposing reciprocable and turnable movement of the sleeve.

5. The combination of a trolley pole, a turnable sleeve thereon, a trolley wheel carried by the sleeve, a spring connecting said sleeve and pole exerting an inward and a torsional pull on the sleeve, and means for limiting the inward movement of the sleeve coöperating with the spring to yieldably oppose turning of the sleeve.

6. In combination with a trolley pole, of a sleeve mounted to have longitudinal and turnable movement on the pole, a spring connected to said sleeve and pole for yieldably opposing said movements, and interengaging members on said sleeve and pole coöperating with the spring to maintain the sleeve in a normal central position.

7. The combination with a trolley pole, of a post thereon, a collar on said post having oppositely inclined faces on its end wall, a sleeve mounted on said post to have rotary and longitudinal movement thereon formed with convergent end faces adapted to engage the inclined faces on the sleeve, and yieldable means exerting an inward pull on the sleeve co-acting with the engaged convergent faces of the sleeve and the inclined faces of the collar to yieldably oppose turning movement of the sleeve and to restore the sleeve to a normal position.

8. The trolley wheel adjuster, consisting of two metal bars connected at the inner ends by a metal spring, said bars and spring being inserted within two adjoining metal tubes, the adjoining ends of which are cut V-shaped on front and rear sides, and circular shaped on both right and left sides, said bars and tubes being brought together in such a manner as to allow the upper tube (which is fastened to the upper bar) to oscillate on the lower bar (which is fastened to the lower tube) at an angle either to right or left from V-shaped point and are held in oscillating position by a metal spring which connects both bars, said upper bar extending outward from the upper tube to allow connection to a trolley wheel connection, and the lower tube extending outward and over the lower bar to connect the upper end of trolley pole.

In testimony whereof, I affix my signature in the presence of two witnesses.

GUSTAVE ULRICH.

Witnesses:
H. LEITHEAD,
L. L. CRISP.